(12) United States Patent
Hill

(10) Patent No.: US 10,257,654 B2
(45) Date of Patent: *Apr. 9, 2019

(54) WIRELESS RELAY STATION FOR RADIO FREQUENCY-BASED TRACKING SYSTEM

(71) Applicant: POSITION IMAGING, INC., Portsmouth, NH (US)

(72) Inventor: Edward L. Hill, Kittery, ME (US)

(73) Assignee: Position Imaging, Inc., Portsmouth, NH (US)

(*) Notice: Subject to any disclaimer, the term of this patent is extended or adjusted under 35 U.S.C. 154(b) by 0 days.

This patent is subject to a terminal disclaimer.

(21) Appl. No.: 15/961,274

(22) Filed: Apr. 24, 2018

(65) Prior Publication Data

US 2018/0242111 A1    Aug. 23, 2018

Related U.S. Application Data

(60) Division of application No. 15/291,364, filed on Oct. 12, 2016, now Pat. No. 9,961,503, which is a (Continued)

(51) Int. Cl.
*H04W 4/02* (2018.01)
*H04W 24/08* (2009.01)
(Continued)

(52) U.S. Cl.
CPC .......... *H04W 4/026* (2013.01); *H04W 24/08* (2013.01); *H04W 64/00* (2013.01); (Continued)

(58) Field of Classification Search
CPC ... H04W 72/04; H04W 24/10; H04W 28/048; H04W 28/08; H04W 72/082
See application file for complete search history.

(56) References Cited

U.S. PATENT DOCUMENTS 3,824,596 A    7/1974 Guion et al.
3,940,700 A    2/1976 Fischer
(Continued)

FOREIGN PATENT DOCUMENTS

WO    2001006401 A1    1/2001

OTHER PUBLICATIONS

Li, et al. "Multifrequency-Based Range Estimation of RFID Tags," IEEE International Conference on RFID, 2009.
(Continued)

*Primary Examiner* — Diane D Mizrahi
(74) *Attorney, Agent, or Firm* — Schmeiser, Olsen & Watts LLP

(57) ABSTRACT

System and methods of tracking a position of a mobile device with an electromagnetic signal-transmitting antenna include receiving electromagnetic signals from the transmitting antenna of the mobile device by a plurality of receiver antennae of a base station and by one or more receiver antennae of a relay station. The relay station transmits to the base station timing information associated with the electromagnetic signals received by the one or more receiver antennae of the relay station. The base station computes a position of the transmitting antenna of the mobile device based on timing information computed from the electromagnetic signals received by the plurality of receiver antennae of the base station and on the timing information received from the relay station.

21 Claims, 5 Drawing Sheets

Related U.S. Application Data continuation of application No. 14/597,360, filed on Jan. 15, 2015, now Pat. No. 9,497,728.

(60) Provisional application No. 61/928,496, filed on Jan. 17, 2014.

(51) Int. Cl.
*H04W 64/00* (2009.01)
*H04W 84/04* (2009.01)
*H04W 88/02* (2009.01)
*H04W 88/08* (2009.01)

(52) U.S. Cl.
CPC ........ *H04W 64/003* (2013.01); *H04W 84/047* (2013.01); *H04W 88/02* (2013.01); *H04W 88/08* (2013.01)

(56) References Cited

U.S. PATENT DOCUMENTS

| | | |
|---|---|---|
| 4,328,499 A | 5/1982 | Anderson et al. |
| 5,010,343 A | 4/1991 | Andersson |
| 5,343,212 A | 8/1994 | Rose et al. |
| 5,426,438 A | 6/1995 | Peavey et al. |
| 5,510,800 A | 4/1996 | McEwan |
| 5,574,468 A | 11/1996 | Rose |
| 5,592,180 A | 1/1997 | Yokev et al. |
| 5,600,330 A | 2/1997 | Blood |
| 5,657,026 A | 8/1997 | Culpepper et al. |
| 5,923,286 A | 7/1999 | Divakaruni |
| 5,953,683 A | 9/1999 | Hansen et al. |
| 6,167,347 A | 12/2000 | Lin |
| 6,255,991 B1 | 7/2001 | Hedin |
| 6,292,750 B1 | 9/2001 | Lin |
| 6,409,687 B1 | 6/2002 | Foxlin |
| 6,412,748 B1 | 7/2002 | Girard |
| 6,417,802 B1 | 7/2002 | Diesel |
| 6,496,778 B1 | 12/2002 | Lin |
| 6,512,748 B1 | 1/2003 | Mizuki et al. |
| 6,593,885 B2 | 7/2003 | Wisherd et al. |
| 6,630,904 B2 | 10/2003 | Gustafson et al. |
| 6,683,568 B1 | 1/2004 | James et al. |
| 6,697,736 B2 | 2/2004 | Lin |
| 6,721,657 B2 | 4/2004 | Ford et al. |
| 6,750,816 B1 | 6/2004 | Kunysz |
| 6,861,982 B2 | 3/2005 | Forstrom et al. |
| 6,989,789 B2 | 1/2006 | Ferreol et al. |
| 7,009,561 B2 | 3/2006 | Menache et al. |
| 7,143,004 B2 | 11/2006 | Townsend et al. |
| 7,168,618 B2 | 1/2007 | Schwartz |
| 7,190,309 B2 | 3/2007 | Hill |
| 7,193,559 B2 | 3/2007 | Ford et al. |
| 7,236,091 B2 | 6/2007 | Kiang et al. |
| 7,236,092 B1 | 6/2007 | Joy |
| 7,292,189 B2 | 11/2007 | Orr et al. |
| 7,295,925 B2 | 11/2007 | Breed et al. |
| 7,409,290 B2 | 8/2008 | Lin |
| 7,443,342 B2 | 10/2008 | Shirai et al. |
| 7,499,711 B2 | 3/2009 | Hoctor et al. |
| 7,533,569 B2 | 5/2009 | Sheynblat |
| 7,612,715 B2 | 11/2009 | MacLeod |
| 7,646,330 B2 | 1/2010 | Karr |
| 7,868,760 B2 | 1/2011 | Smith |
| 7,876,268 B2 | 1/2011 | Jacobs |
| 8,269,624 B2 | 9/2012 | Chen et al. |
| 8,457,655 B2 | 6/2013 | Zhang et al. |
| 8,749,433 B2 | 6/2014 | Hill |
| 8,957,812 B1 | 2/2015 | Hill et al. |
| 9,063,215 B2 | 6/2015 | Perthold et al. |
| 9,120,621 B1 | 9/2015 | Curlander |
| 9,482,741 B1 | 11/2016 | Min et al. |
| 9,497,728 B2 * | 11/2016 | Hill ...................... H04W 64/00 |
| 9,519,344 B1 | 12/2016 | Hill |
| 9,782,669 B1 | 10/2017 | Hill |
| 9,933,509 B2 | 4/2018 | Hill et al. |
| 9,961,503 B2 * | 5/2018 | Hill ...................... H04W 64/00 |
| 2002/0021277 A1 | 2/2002 | Kramer et al. |
| 2002/0140745 A1 | 10/2002 | Ellenby |
| 2003/0053492 A1 | 3/2003 | Matsunaga |
| 2003/0120425 A1 | 6/2003 | Stanley et al. |
| 2003/0195017 A1 | 10/2003 | Chen et al. |
| 2004/0095907 A1 | 5/2004 | Agee et al. |
| 2004/0176102 A1 | 9/2004 | Lawrence et al. |
| 2004/0203846 A1 | 10/2004 | Caronni et al. |
| 2005/0143916 A1 | 6/2005 | Kim et al. |
| 2005/0184907 A1 | 8/2005 | Hall et al. |
| 2005/0275626 A1 | 12/2005 | Mueller et al. |
| 2006/0013070 A1 | 1/2006 | Holm et al. |
| 2006/0061469 A1 | 3/2006 | Jaeger et al. |
| 2006/0066485 A1 | 3/2006 | Min |
| 2006/0101497 A1 | 5/2006 | Hirt et al. |
| 2006/0279459 A1 | 12/2006 | Akiyama et al. |
| 2006/0290508 A1 | 12/2006 | Moutchkaev et al. |
| 2007/0060384 A1 | 3/2007 | Dohta |
| 2007/0138270 A1 | 6/2007 | Reblin |
| 2007/0205867 A1 | 9/2007 | Kennedy et al. |
| 2007/0210920 A1 | 9/2007 | Panotopoulos |
| 2007/0222560 A1 | 9/2007 | Posamentier |
| 2008/0048913 A1 | 2/2008 | Macias et al. |
| 2008/0143482 A1 | 6/2008 | Shoarinejad et al. |
| 2008/0154691 A1 | 6/2008 | Wellman et al. |
| 2008/0204322 A1 | 8/2008 | Oswald et al. |
| 2008/0316324 A1 | 12/2008 | Rofougaran et al. |
| 2009/0149202 A1 | 6/2009 | Hill et al. |
| 2009/0243932 A1 | 10/2009 | Moshfeghi |
| 2010/0090852 A1 | 4/2010 | Eitan et al. |
| 2010/0103173 A1 | 4/2010 | Lee et al. |
| 2010/0103989 A1 | 4/2010 | Smith et al. |
| 2010/0123664 A1 | 5/2010 | Shin et al. |
| 2011/0006774 A1 | 1/2011 | Baiden |
| 2011/0037573 A1 | 2/2011 | Choi |
| 2011/0187600 A1 | 8/2011 | Landt |
| 2011/0208481 A1 | 8/2011 | Slastion |
| 2011/0210843 A1 | 9/2011 | Kummetz |
| 2011/0241942 A1 | 10/2011 | Hill |
| 2011/0256882 A1 | 10/2011 | Markhovsky et al. |
| 2012/0013509 A1 | 1/2012 | Wisherd et al. |
| 2012/0127088 A1 | 5/2012 | Pance et al. |
| 2012/0184285 A1 | 7/2012 | Sampath et al. |
| 2012/0286933 A1 | 11/2012 | Hsiao |
| 2012/0319822 A1 | 12/2012 | Hansen |
| 2013/0021417 A1 | 1/2013 | Ota et al. |
| 2013/0036043 A1 | 2/2013 | Faith |
| 2013/0314210 A1 | 11/2013 | Schoner et al. |
| 2014/0022058 A1 | 1/2014 | Striemer et al. |
| 2014/0253368 A1 | 9/2014 | Holder |
| 2014/0300516 A1 | 10/2014 | Min et al. |
| 2014/0361078 A1 | 12/2014 | Davidson |
| 2015/0009949 A1 | 1/2015 | Khoryaev et al. |
| 2015/0039458 A1 | 2/2015 | Reid |
| 2015/0091757 A1 | 4/2015 | Shaw et al. |
| 2015/0169916 A1 | 6/2015 | Hill et al. |
| 2015/0221135 A1 | 8/2015 | Hill et al. |
| 2015/0323643 A1 | 11/2015 | Hill et al. |
| 2015/0362581 A1 | 12/2015 | Friedman et al. |
| 2015/0379366 A1 | 12/2015 | Nomura |
| 2016/0035078 A1 | 2/2016 | Lin |
| 2016/0142868 A1 | 5/2016 | Kulkarni et al. |
| 2016/0156409 A1 | 6/2016 | Chang |
| 2016/0178727 A1 | 6/2016 | Bottazzi |
| 2016/0238692 A1 | 8/2016 | Hill et al. |
| 2016/0256100 A1 | 9/2016 | Jacofsky et al. |
| 2016/0286508 A1 | 9/2016 | Khoryaev et al. |
| 2016/0366561 A1 | 12/2016 | Min et al. |
| 2016/0370453 A1 | 12/2016 | Boker et al. |
| 2016/0371574 A1 | 12/2016 | Nguyen et al. |
| 2017/0030997 A1 | 2/2017 | Hill |
| 2017/0031432 A1 | 2/2017 | Hill |
| 2017/0234979 A1 | 8/2017 | Mathews et al. |
| 2017/0323174 A1 | 11/2017 | Joshi et al. |
| 2017/0350961 A1 | 12/2017 | Hill |
| 2017/0372524 A1 | 12/2017 | Hill |

(56) References Cited

U.S. PATENT DOCUMENTS

| | | |
|---|---|---|
| 2018/0068266 A1 | 3/2018 | Kirmani |
| 2018/0164103 A1 | 6/2018 | Hill |
| 2018/0197139 A1 | 7/2018 | Hill |

OTHER PUBLICATIONS

Welch, Greg and Gary Bishop, "An Introduction to the Kalman Filter," Department of Computer Science, University of North Carolina at Chapel Hill, Chapel Hill, NC 27599-3175, Updated: Monday, Jul. 24, 2006.

Min, et al. "Systems and Methods of Wireless Position Tracking" U.S. Appl. No. 15/953,798, filed Apr. 16, 2018.

Schneider, et al. "Radio Frequency Communication System," U.S. Appl. No. 13/975,724, filed Aug. 26, 2013.

Hill, et al. "Spatial Diveristy for Relative Position Tracking" U.S. Appl. No. 15/404,668, filed Jan. 12, 2017.

Hill, et al. "Package Tracking Systems and Methods" U.S. Appl. No. 15/091,180, filed Apr. 5, 2016.

Seiger, et al. "Modular Shelving Systems for Package Tracking" U.S. Appl. No. 15/270,749, filed Sep. 20, 2016.

Hill, et al. "Video for Real-Time Confirmation in Package Tracking Systems" U.S. Appl. No. 15/416,366, filed Jan. 26, 2017.

Piotrowski, et al. "Light-Based Guidance for Package Tracking Systems" U.S. Appl. No. 15/416,379, filed Jan. 26, 2017.

Min, et al. "Expandable, Decentralized Position Tracking Systems and Methods" U.S. Appl. No. 15/446,602, filed Mar. 1, 2017.

Hill, et al. "Position Tracking System and Method Using Radio Signals and Inertial Sensing" U.S. Appl. No. 14/600,025, filed Jan. 20, 2015.

Notice of Allowance in U.S Appl. No. 15/291,364 dated Mar. 15, 2018; 10 pages.

Final Office Action in U.S. Appl. No. 15/291,364 dated Dec. 12, 2017; 12 pages.

Non-Final Office Action in U.S. Appl. No. 15/291,364 dated Jul. 10, 2017; 12 pages.

Restriction Requirement in U.S. Appl. No. 15/291,364 dated Apr. 19, 2017; 8 pages.

Notice of Allowance in U.S Appl. No. 14/597,360 dated Jul. 26, 2016; 9 pages.

Non-Final Office Action in U.S Appl. No. 14/597,360 mailed on 14/597,360; 9 pages.

Proakis, John G. and Masoud Salehi, "Communication Systems Engineering", Second Edition, Prentice-Hall, Inc., Upper Saddle River, New Jersey, 2002; 815 pages.

Schmidt & Phillips, "INS/GPS Integration Architectures", NATO RTO Lecture Seriers, First Presented Oct. 20-21, 2003; 24 pages.

J. Farrell & M. Barth, "The Global Positioning System & Inertial Navigation" pp. 245-252 (McGraw-Hill, 1999).

Grewal & Andrews, "Global Positioning Systems, Inertial Nagivation, and Integration", 2001, John Weiley and Sons, pp. 252-256.

"Development of a Precise GPS/INS/On-Board Vehicle Sensors Integrated Vehicular Positioning System," Jianchen Gao, UCGE Reports No. 20255, Jun. 2007.

Goodall, Christopher L., "Improving Usability of Low-Cost INS/GPS Navigation Systems using Intelligent Techniques", Jan. 2009, UCGE Reports No. 20276; 234 pages.

Vikas Kumar N., "Integration of Inertial Navigation System and Global Positioning System Using Kalman Filtering", M. Tech Dissertation, Indian Institute of Technology, Bombay, Mumbai, Jul. 2004; 69 pages.

Filho, et al., "Integrated GPS/INS Navigation System Based on a Gyrpscope-Free IMU", DINCON Brazilian Conference on Synamics, Control, and Their Applications, May 22-26, 2006; 6 pages.

"ADXL/ADXL210 Product Sheet", Analog Devices, Inc., Analog.com, 1999; 11 pages.

Pourhomayoun, Mohammad and Mark Fowler, "Improving WLAN-based Indoor Mobile Positioning Using Sparsity," Conference Record of the Forty Sixth Asilomar Conference on Signals, Systems and Computers, Nov. 4-7, 2012, pp. 1393-1396, Pacific Grove, California.

Yang, Yong, "Tightly Coupled MEMS INS/GPS Integration with INS Aided Receiver Tracking Loops", Jun. 2008, UCGE Reports No. 20270; 205 pages.

Sun, Debo, "Ultra-Tight GPS/Reduced IMU for Land Vehicle Navigation", Mar. 2010, UCGE Reports No. 20305; 254 pages.

Sun, et al., "Analysis of the Kalman Filter With Different INS Error Models for GPS/INS Integration in Aerial Remote Sensing Applications", Bejing, 2008, The International Archives of the Photogrammerty, Remote Sensing and Spatial Information Sciences vol. XXXVII, Part B5.; 8 pages.

"Integration of a GPS aided Strapdown Inertial Navigation System for Land Vehicles," Adrian Schumacher, KTH Electrical Engineering, XR-EE-SB 2006:006.

Gautier, Jennifer Denise, "GPS/INS Generalized Evaluation Tool (GIGET) for the Design and Testing of Integrated Navigation Systems", Dissertation, Stanford University, Jun. 2003; 160 pages.

"Real-time differential Carrier Phase GPS-Aided INS," Jay Farrell, tony Givargis, Matthew Barth, IEEE Transactions on control Systems Technology, vol. 8, No. 4, Jul. 2000.

Alban, Santiago, "Design and Performance of a Robust GPS/INS Attitude System for Automobile Applications", Dissertation, Stanford University, Jun. 2004; 218 pages.

Hill, et al., "System and Method of Personalized Navigation Inside a Business Enterprise," U.S. Appl. No. 16/163,708, filed Oct. 18, 2018; 36 pages.

Wilde, Andreas, "Extended Tracking Range Delay-Locked Loop," Proceedings IEEE International Conference on Communications, Jun. 1995, pp. 1051-1054.

\* cited by examiner

WIRELESS RELAY STATION FOR RADIO FREQUENCY-BASED TRACKING SYSTEM

RELATED APPLICATION

This application is a divisional of U.S. patent application Ser. No. 15/291,364, filed Oct. 12, 2016, titled "Wireless Relay Station for Radio-Frequency-Based Tracking System," which is a continuation of U.S. patent application Ser. No. 14/597,360, filed Jan. 15, 2015, titled "Wireless Relay Station for Radio Frequency-Based Tracking System", which claims the benefit of and priority to U.S. provisional application no. 61/928,496, filed Jan. 17, 2014, titled "Wireless Relay Station for Radio Frequency-Based Tracking System," the entireties of which are incorporated by reference herein.

FIELD OF THE INVENTION

The invention relates generally to systems and methods for tracking the position of electromagnetic signal transmitting devices. In particular, the invention relates to radio frequency (RF)-based wireless position tracking systems that use one or more wireless relay stations.

BACKGROUND

Position tracking systems can use a variety of configurations for tracking the two- or three-dimensional position of a wireless device. In many arrangements, a system may require three or more base receivers (or three or more base antennae connected to a single base receiver) to receive some form of data from a wireless device and use that data to calculate the position of the device. The data can be timing information, signal strength, or angle of arrival measurements of the signal transmitted by the device and received at the base receiver(s) antennae of the system. In all arrangements, the position of the base receiver antennae of the system is important for calculating the position of the device and often these antennae are wired to the system for computing the position of the device.

Over the years, several different forms of tracking systems have evolved with the most notable being Global Positioning System or GPS. For GPS, the mobile receiver uses timing information sent from satellites and then calculates the position of the GPS receiver with the mobile receiver doing the position computation using the timing information from the satellite signals.

SUMMARY

All examples and features mentioned below can be combined in any technically feasible way.

Embodiments of position-tracking systems described herein, unlike GPS, perform position calculation using signals sent from the wireless device being tracked. This allows the device to be simple, but does add some complexity to the position-tracking system. The position-tracking systems use one or more wireless relay stations communicating with a base station which uses multiple receive locations of the wireless relay stations as coordinate references for performing timing and positioning calculations on a wireless device communicating with the base station and the wireless relay stations. By incorporating one or more wireless relay stations, the system can improve setup options, improve accuracy and provide a larger working volume for the wireless device.

One example design for a position-tracking system for three-dimensional tracking comprises at least four base receivers (or one base receiver with four base antennae) wired to the base station. These base receivers receive the wireless signals sent from the mobile wireless device being tracked and send that information to the base station for position computation. In one embodiment, the base receivers are fixed in position in space and wired to the base station. However, this design can be limiting as the wired base receivers can reduce the working volume and increase cost because they are tethered to the base station, making spacing of their antennae more difficult and expensive to setup. For example, a wireless mouse tracked in three dimensions for interaction with games or other interactive software programs can only be tracked within the working area defined by the spacing of the base receivers of the base station. If these base receivers or receiver antennae are placed around a television, the working volume is defined by the position of the base receivers, and accuracy may diminish as the device being tracked moves away from the central point of the positions of the base receivers. If the position-tracking system uses a device signal of arrival time differential compared at each receiver (or antenna) for making position calculations, this limited base receiver or receiver antenna spacing caused by a wired connection can be especially limiting.

A position-tracking system that incorporates one or more wireless relay stations to add additional measurements used for tracking by the position-tracking system can significantly improve over position-tracking systems requiring fully wired or tethered base receivers together with their corresponding antennae. Receiving timing information from the device being tracked, each relay station can expand the working volume or tracked area of the device and provide more options for product integration and position-tracking system set up. Also, by expanding the distances between total receivers or receiver antennae, the position-tracking system can improve position accuracy, allowing more precise measurements.

Each relay station communicates wirelessly with both the device being tracked and a base station performing the position tracking function. Alternatively, one or more relay stations can be wired to the base station, with wires replacing the wireless communication channel. In that embodiment, each relay station is in a fixed position, such as plugged into an electrical outlet, or be battery powered. During installation, each transmitter of each relay station acts like one or more "devices" communicating with the base station, and the base station determines the position of that transmitter. This information locates the relay station with respect to the receiver antennae of the base station. The base station also locates the position of each receiver antenna of a relay station with respect to the transmitter antennae of that relay station. Alternatively, relay stations can be placed at fixed known positions to provide the base station with the known coordinates for making position calculations.

During normal (tracking) operation, the device being tracked transmits the signal used to generate timing information, this signal being received at both the wired base antennae connected to the base station and the wireless relay station(s) receiving antenna(e). The relay station can be equipped with at least two receivers or receiver antennae and uses the multiple receive points provided by these separate receivers or antennae to compare timing differences in the device signal arrival at each receiver or receiver antenna. As the signal is received at the relay station, the time difference of arrival (or, equivalently, the phase difference of arrival) is calculated between both (or more) receivers or receiver antennae in the relay station. Because phase (θ) and time (t) are related by θ=ωt, where w is a scalar, phase and time are equivalent systems and subsequent descriptions may be denoted by time or time differences, as appropriate.

This timing data calculated by the relay station is sent to the base station, preferably in a wireless manner, where the base station can use that timing data from each relay station receiver or receiver antenna as additional equations for calculating the position of the device. By doing timing comparisons and calculations at the relay station, the position-tracking system can avoid a timing path error from the relay station to the base station, thereby allowing the relay station to send data that is unaffected by radio propagation and interference instability, such as multipath on the round trip. Because interference like multipath is additive, removing one of the paths for this timing data significantly improves system performance through the reduction of multipath effects. If the relay station is configured with a single transceiver and antenna, techniques can reduce the effects of interference, such as implementing a duplex system whereby the receiver portion of the relay station transceiver receives at one spectrum, for example, 2.4 GHz, and the return transmission from the same relay station is at a different spectrum, for example, 5.8 GHz.

Whereas using the same antenna for both receiving and transmitting is optimal, it may not be trivial or cost effective to multiplex the circuitry attached to this antenna to achieve both functions in a real-time manner. Another technique is to place the receiver and transmitter antenna concentrically, so that they share the same origin. Designs for concentric antenna, however, may be difficult to implement.

In one embodiment, the relay station is equipped with at least two receivers, or receiver antennae, and uses two transmitters to retransmit the phase information of the device, properly coded and correlated to its signal arrival at the relay station receivers or receiver antennae. The relay station sends this phase/timing information to the position-tracking system using any of a variety of means. This transmission can be accomplished directly with common or additional wireless signal channels. These signal channels can communicate wirelessly on a different frequency channel, for example, by using different encoding. This transmission can also be sent using powerline communication. Preferably, the transmission is sent at a compatible frequency over one or both transmitter channels employed by the transmitter(s) of the relay station.

In one aspect, a method of tracking a position of a mobile device with an electromagnetic signal-transmitting antenna include receiving electromagnetic signals from the transmitting antenna of the mobile device by a plurality of receiver antennae of a base station and by one or more receiver antennae of a relay station. The relay station transmits to the base station timing information associated with the electromagnetic signals received by the one or more receiver antennae of the relay station. The base station computes a position of the transmitting antenna of the mobile device based on timing information computed from the electromagnetic signals received by the plurality of receiver antennae of the base station and on the timing information received from the relay station.

In another aspect, a position-tracking system comprises a base station with a processor, at least three spatially separated receiver antennae disposed at locations known to the processor of the base station. Each of the at least three receiver antennae receive electromagnetic signals transmitted by a transmitting antenna of a mobile device. The position-tracking system further comprises one or more relay stations in communication with the base station and with the transmitting antenna of the mobile device. Each relay station is disposed at a distance from the base station known to the processor of the base station. Each relay station comprises a processor, one or more receiving antennae that receive the electromagnetic signals transmitted by the transmitting antenna of the mobile device, and one or more transmitter antennae. The transmitter antennae of each relay station send timing information to the base station associated with the electromagnetic signals received by the one or more receiver antennae of the relay station. The processor of the base station uses the timing information received from the one or more relay stations and the timing information associated with the electromagnetic signals received by the at least three receiver antennae of the base station to compute the position of the transmitting antenna.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
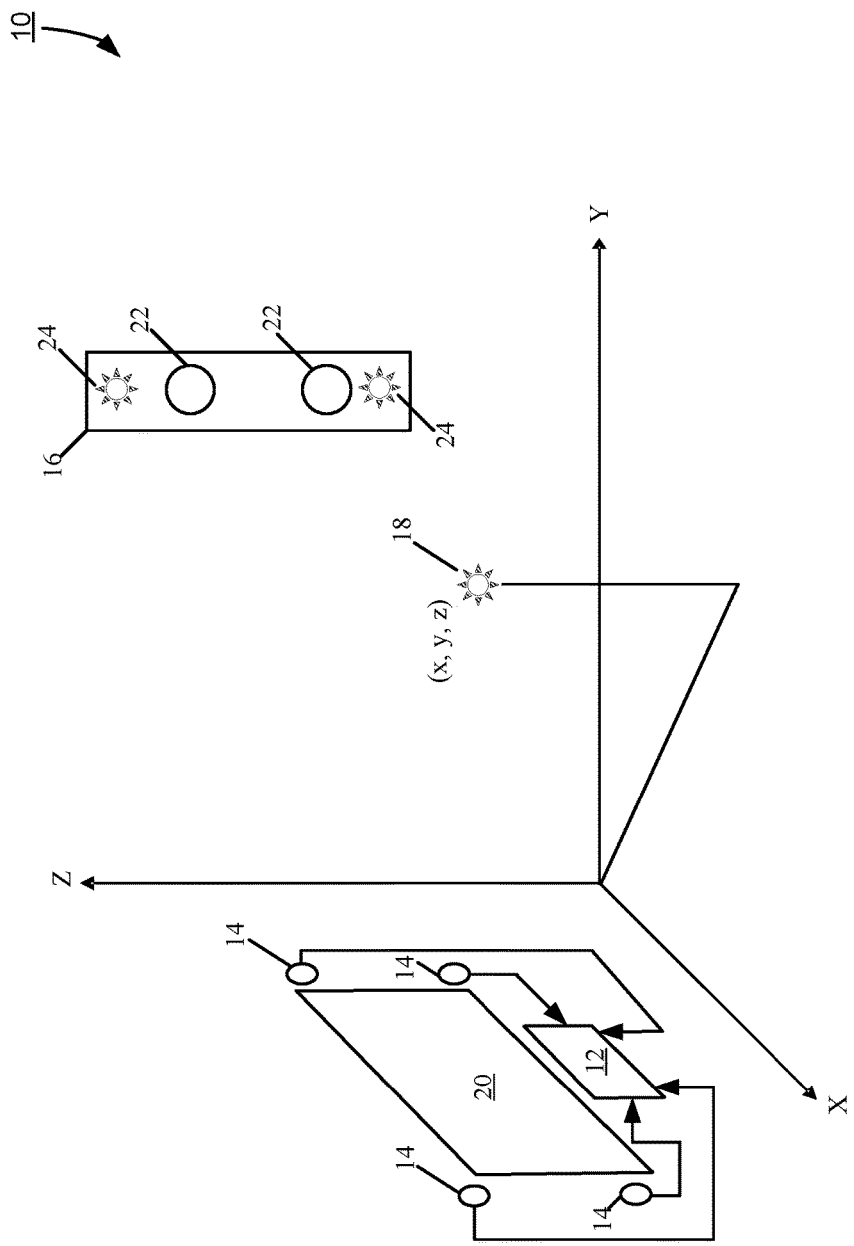
FIG. 1 is a block diagram of an embodiment of a position-tracking system, including a base station in communication with a relay station, for tracking the position of an electromagnetic signal transmitting device.

FIG. 1 shows an embodiment of a position-tracking system 10 comprising base station hardware (or simply base station) 12 in communication with multiple base receivers or receiver antennae 14 (hereafter, bas receiver antenna 14) and with one or more relay stations 16 (only one shown), for tracking the position of an electromagnetic signal (e.g., radio frequency) emitting transmitter or transmitter antenna 18 (hereafter, transmitter antenna 18). The transmitter antenna 18 is carried by, attached to, or embedded in a tracked object. Although only one transmitter antenna 18 is shown, the object can have more than one tracked transmitter antenna 18, to allow the orientation of the object to be calculated based on geometric principles. For example, two transmitter antennae, separated by a distance d, yield a pointer, because the two transmitter antennae form a line with known direction. Three transmitter antennae provide enough information to calculate a three-dimensional orientation.

To track the position of a single transmitter antenna 18 in three dimensions (x, y, z), one embodiment of the position-tracking system 10 has at least four receiver antennae 14. For two-dimensional position tracking, the position-tracking system 10 may have as few as three base receiver antennae 14. The base receiver antennae 14 are distinct and fixed in space, and provide a reference frame within which the transmitter antennae 18 is tracked. In this example, the base receiver antennae 14 are disposed around a monitor 20. Additional base receiver antennae can provide better coverage and more accuracy, at the expense of complexity and cost.

The configuration of the position-tracking system 10 can be reversed, with the base receiver antennae 14 being tracked and the transmitter antennae providing the reference frame. Alternatively, inertial sensors could be integrated in the object with the wireless transmitter antenna 18 being tracked to provide orientation.

The relay station 16 has two or more receivers or receiver antennae 22 (hereafter, relay station receiver antenna 22) and two or more transmitters or transmitting antenna 24. The two or more receiver antennae 22 are at known distances apart from each other and from the transmitting antenna 24. The position-tracking system 10 can have multiple of such relay stations, with each additional relay station thus adding at least two additional receiver antennae 22 to the system 10. As noted above, additional receiver antennae provide better accuracy and coverage. These relay station receivers 22 provide the additional coverage for the position-tracking system 10 to minimize multipath and to increase range.

The relay station 16 is effectively a transceiver that, when acting as a receiver, provides additional information for a tracking algorithm used by the base station 12 to compute the position of the transmitter antenna 18. The signal received by the relay station 16 are processed at the relay station 16 (by the hardware portion of the relay station—not shown—that is part of the receiver) and re-transmitted to the base receiver antennae 14. This transmission can be done by cables or wirelessly. The relay station 16 can function similarly to the base station 12, whose operation is described below, to analyze a time of arrival difference at the multiple receiver antennae 22 that are part of the relay station 16.

Alternatively, the relay station 16 can operate with a single receiver antenna 22, in which case the received signal from the wireless transmitter antenna 18 being tracked can either be instantaneously re-transmitted by the relay station 16 (MIMO) to maintain a time relationship (provided the distance path between the relay station 16 and each base receiver antenna 14 is fixed and known) or converted to a different frequency to avoid frequency collision or interference. MIMO (Multiple-Input Multiple-Output) systems use more than one transmit antenna to send a signal on the same frequency to more than one receive antenna.

The relay station can be any one of a variety of mobile devices used for other functions, such as smart phones, tablets, or laptops, provided the position of the relay station 16 is known or remains fixed in space during position-tracking operation (i.e., when communicating with the base station 12 and the mobile transmitter antenna 18).

Figure 2:
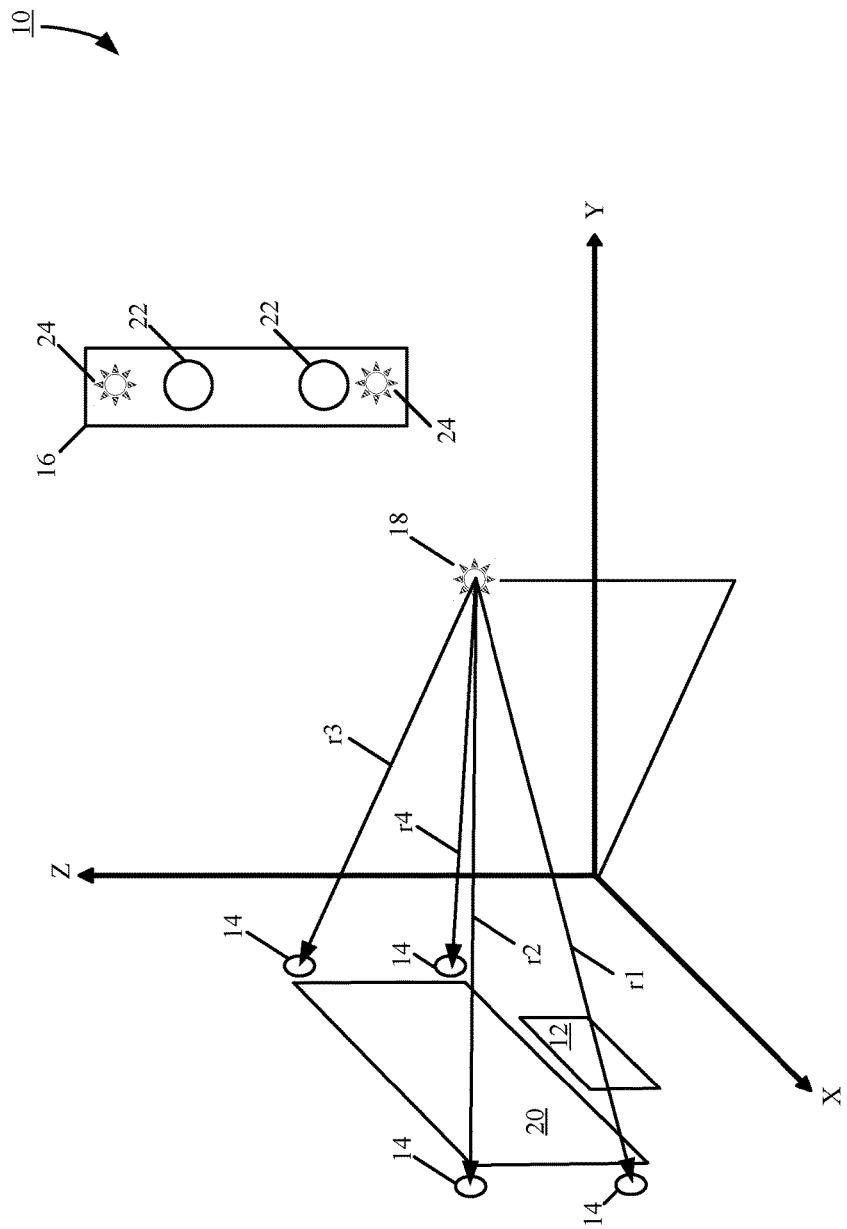
FIG. 2 is a diagram for illustrating position measurements based on device transmitter to base station receiver transmissions.

FIG. 2 shows an example of operation of the position-tracking system 10 using phase for timing comparisons. The base station 12 has a processor (not shown), such as a central processing unit or CPU, programmed to perform a position-tracking algorithm. The position-tracking algorithm is based on a best-fit of the time of flight measurements between the transmitter antenna 18 with the object and the base receiver antennae 14. An example implementation of the position-tracking algorithm is described in U.S. application Ser. No. 14/354,833, filed on Apr. 28, 2014, titled "Systems and Methods of Wireless Position Tracking," the entirety of which application is incorporated by reference herein.

In this phase-based embodiment of the position-tracking system 10, the phase of the RF signal transmitted by the transmitter 18 is used to measure distance. A phase shift of 360° corresponds to one wavelength, and, by measuring the phase differences of the transmitter signal recorded at two base receiver antennae 14, the distance is calculated. In the following equations (Eq. 1-Eq. 4), r1, r2, r3, and r4 represent distances between the positions of the base receiver antennae 14 and the position of the transmitter 18, and are represented by the phases. Receiver positions are denoted as $rcvpos_{receiver\ number,\ position\ coordinate}$, and are fixed, known quantities. Position coordinate 1, 2, 3 represent x, y, z, respectively.

$$r1 = \sqrt{(rcvrpos_{1,1} - x_1)^2 + (rcvrpos_{1,2} - x_2)^2 + (rcvrpos_{1,3} - x_3)^2} \quad \text{(Eq. 1)}$$

$$r2 = \sqrt{(rcvrpos_{2,1} - x_1)^2 + (rcvrpos_{2,2} - x_2)^2 + (rcvrpos_{2,3} - x_3)^2} \quad \text{(Eq. 2)}$$

$$r3 = \sqrt{(rcvrpos_{3,1} - x_1)^2 + (rcvrpos_{3,2} - x_2)^2 + (rcvrpos_{3,3} - x_3)^2} \quad \text{(Eq. 3)}$$

$$r4 = \sqrt{(rcvrpos_{4,1} - x_1)^2 + (rcvrpos_{4,2} - x_2)^2 + (rcvrpos_{4,3} - x_3)^2} \quad \text{(Eq. 4)}$$

$$\delta_{1,2} = r1 - r2 \quad \text{(Eq. 5)}$$

$$\delta_{1,3} = r1 - r3 \quad \text{(Eq. 6)}$$

$$\delta_{1,4} = r1 - r4 \quad \text{(Eq. 7)}$$

The differences between the phase measurements ($\delta$'s, Eq. 5-Eq. 7), which are calculated by the base station hardware, are used to solve for x1, x2 and x3, which represents the x, y, z positions of the device transmitter antenna 18, respectively. As is known in the art, this can be solved in a least squares algorithm, such as Levenberg-Marquardt or in a Kalman filter. Also known in the art is that more range measurements can be used to form an overdetermined solution, and also allows other methods to be used, such as weighted solutions, selecting a subset of equations, etc. These additional range measurements can be provided for by the relay station 16.

Figure 3:
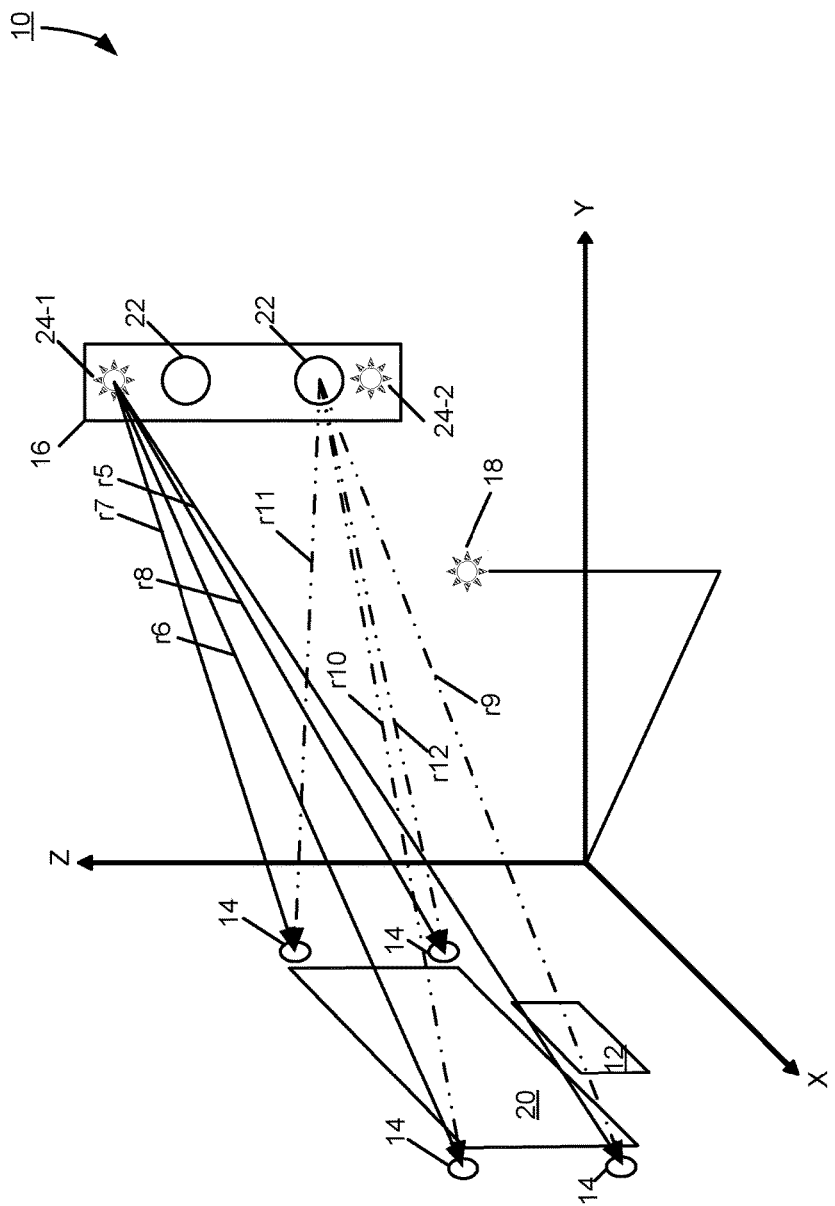
FIG. 3 is a diagram for illustrating position measurements based on relay station transmitter to base station receiver transmissions.

FIG. 3 shows an example of transmissions from the relay station 16 to the base receiver antennae 14. The relay station 16 resides at a location where the relay station can improve in tracking the transmitter 18. For example, this location may be on a wall, behind the user, on a ceiling. Before data from the relay station 16 can be used to improve performance, the position of the relay station 16 relative to the base station 12 needs to be determined. Specifically, the positions of the receiver antennae 22 of the relay station 16 need to be determined; this information can reside at the base station 12.

To determine the positions of the receiver antennae 22, the transmitters 24-1 and 24-2 are utilized in a first manner. These transmitters 24-1, 24-2 operate like transmitter antenna 18, except that the transmitters 24-1, 24-2 transmit at different frequencies from each other so that they can be differentiated from one another. The positions of the transmitters 24-1, 24-2 are computed just like that of the transmitter antenna 18. The equations to compute these positions are similar to Eq. 1-Eq. 7. The equations (Eq. 8-Eq. 14) for transmitter 24-1, which use ranges r5, r6, r7, and r8, are:

$$r5 = \sqrt{(rptrpos_{5,1} - x_1)^2 + (rptrpos_{5,2} - x_2)^2 + (rptrpos_{5,3} - x_3)^2} \quad \text{(Eq. 8)}$$

$$r6 = \sqrt{(rptrpos_{6,1} - x_1)^2 + (rptrpos_{6,2} - x_2)^2 + (rptrpos_{6,3} - x_3)^2} \quad \text{(Eq. 9)}$$

$$r7 = \sqrt{(rptrpos_{7,1} - x_1)^2 + (rptrpos_{7,2} - x_2)^2 + (rptrpos_{7,3} - x_3)^2} \quad \text{(Eq. 10)}$$

$$r8 = \sqrt{(rptrpos_{8,1} - x_1)^2 + (rptrpos_{8,2} - x_2)^2 + (rptrpos_{8,3} - x_3)^2} \quad \text{(Eq. 11)}$$

$$\delta_{5,6} = r5 - r6 \quad \text{(Eq. 12)}$$

$$\delta_{5,7} = r5 - r7 \quad \text{(Eq. 13)}$$

$$\delta_{5,8} = r5 - r8 \quad \text{(Eq. 14)}$$

And the equations (Eq. 15-Eq. 21) for transmitter 24-2, which uses ranges r9, r10, r11, and r12, are:

$$r9 = \sqrt{(rptrpos_{9,1} - x_1)^2 + (rptrpos_{9,2} - x_2)^2 + (rptrpos_{9,3} - x_3)^2} \quad \text{(Eq. 15)}$$

$$r10 = \quad \text{(Eq. 16)}$$
$$\sqrt{(rptrpos_{10,1} - x_1)^2 + (rptrpos_{10,2} - x_2)^2 + (rptrpos_{10,3} - x_3)^2}$$

$$r11 = \quad \text{(Eq. 17)}$$
$$\sqrt{(rptrpos_{11,1} - x_1)^2 + (rptrpos_{11,2} - x_2)^2 + (rptrpos_{11,3} - x_3)^2}$$

$$r12 = \quad \text{(Eq. 18)}$$
$$\sqrt{(rptrpos_{12,1} - x_1)^2 + (rptrpos_{12,2} - x_2)^2 + (rptrpos_{12,3} - x_3)^2}$$

$$\delta_{9,10} = r9 - r10 \quad \text{(Eq. 19)}$$

$$\delta_{9,11} = r9 - r11 \quad \text{(Eq. 20)}$$

$$\delta_{9,12} = r9 - r12 \quad \text{(Eq. 21)}$$

These two sets of equations, (Eq. 8-Eq. 14) and (Eq. 15-Eq. 21) are used separately to solve for $x_1$, $x_2$ and $x_3$, which represents the x, y, z, position, of each transmitter antenna 24-1 and 24-2, respectively.

After the positions of transmitters 24-1 and 24-2 are known, it is straightforward to determine the positions of the receiver antennae 22. The two computed locations of the transmitter antennae 24-1 and 24-2 provide reference points for determining the locations of the receiver antennae 22. Geometry and knowledge of the antennae layout provides the locations of the receiver antennae 22. An example is to place receiver antenna 22 in a line between transmitter antenna 24-1 and 24-2. This provides exact knowledge of where each receiver antenna 22 is positioned. This calculation can be performed at the relay station 16 or at the base station 12. After these positions are determined, the second means of use of transmitter antennae 24-1, 24-2 occurs. The relay station 16 transmits this position information using the same transmitter antennae 24-1, 24-2 using standard information transmission methods, such as used for cellular communication, Wi-Fi, etc., as is known in the art. Both the base station 12 and the relay station 16 contain standard circuitry for performing this operation and is multiplexed in at the appropriate setup time while the position-tracking system 10 is in a setup mode.

In one alternative embodiment, the receiver antennae 22 and transmitter antennae 24 of the relay station 16 may be embodied in a single antennae and transmission/receipt of signals can be separated by time or frequency. In another alternative embodiment, the position of the transmitter antennae 24 and receiver antennae 22 may be fixed using another device, such as a GPS or mobile phone with locating ability. For example, a user might determine the position of antennae 22 and 24 as derived from another device (GPS) and this information would be transmitted to the base station 12. Subsequently, as described above, the relay station 16 can provide tracking information for the device transmitter 18.

Figure 4:
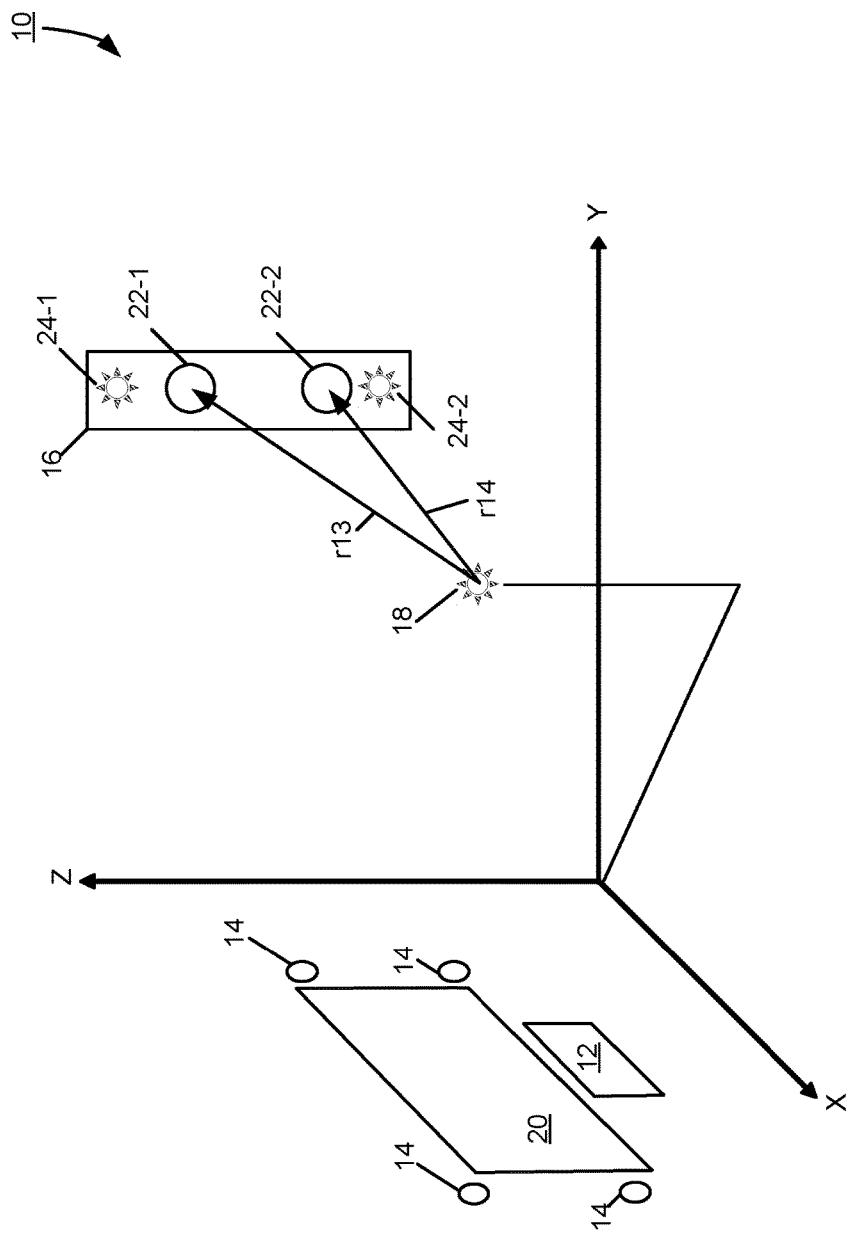
FIG. 4 is a diagram for illustrating position measurements based on device transmitter to relay station receiver transmissions.

FIG. 4 illustrates the additional receiver paths between the transmitter antenna 18 and the relay station receiver antennae 22-1 and 22-2. Path r13 and path r14 correspond to the distances between the transmitter 18 and the receiver antennae 22-1 and 22-2, respectively. Relay station receiver positions are denoted as rptrpos$_{receiver\ number,\ position\ coordinate}$, and are fixed, known quantities, as determined above in connection with FIG. 3. Position coordinates 1, 2, 3 represent x, y, z, respectively. The measurements of the two ranges r13 and r14 are performed in a similar manner to the equations used by the base station 12 to compute the position of the transmitter 18.

$$r13 = \quad \text{(Eq. 22)}$$
$$\sqrt{(rptrpos_{13,1} - x_1)^2 + (rptrpos_{13,2} - x_2)^2 + (rptrpos_{13,3} - x_3)^2}$$

$$r14 = \quad \text{(Eq. 23)}$$
$$\sqrt{(rptrpos_{14,1} - x_1)^2 + (rptrpos_{14,2} - x_2)^2 + (rptrpos_{14,3} - x_3)^2}$$

$$\delta_{13,14} = r13 - r14 \quad \text{(Eq. 24)}$$

The difference between the phase measurements ($\delta_{13,\ 14}$, Eq. 24), which is calculated in the hardware (e.g., processor) of the relay station 16 in a similar method to those determined at the base station 12, is used by the base station 12 together with Eq. 5, Eq. 6, and Eq. 7 to solve for $x_1$, $x_2$ and $x_3$, which represents the x, y, z, position of the transmitter 18, respectively.

Before the base station 12 can use the computed value for $\delta_{13,\ 14}$, from equation (Eq. 24), the relay station 16 needs to send the value to the base station 12. This information is transmitted using the same transmitter antennae 24-1, 24-2 using standard information transmission methods such as used for cellular communication, Wi-Fi, etc., as is known in the art. Both the base station 12 and the relay station 16 contain standard circuitry for performing this operation, which is multiplexed in at the appropriate setup time while the position-tracking system 10 is in a tracking mode.

The relay station 16 is then placed in a mode that allows its two transmitters 24-1 and 24-2 to transmit distinguishable signals and to the base receiver antennae 14. As is known in the art, this can take the form of frequency or time multiplexing. Similarly to how the transmitter antenna 18 is located using equations (Eq. 1-Eq. 7), the transmitters 24-1 and 24-2 are located using the same equations, but with ranges r5-r8 (FIG. 3) and r9-r12 (FIG. 3), respectively, substituting for ranges r1-r4. This provides an x, y, z, position of each transmitter 24-1 and 24-2. From the positions of the transmitters 24-1 and 24-2, the locations of the receiver antennae 22-1, 22-2 can be determined as described in connection with FIG. 3.

Figure 5:
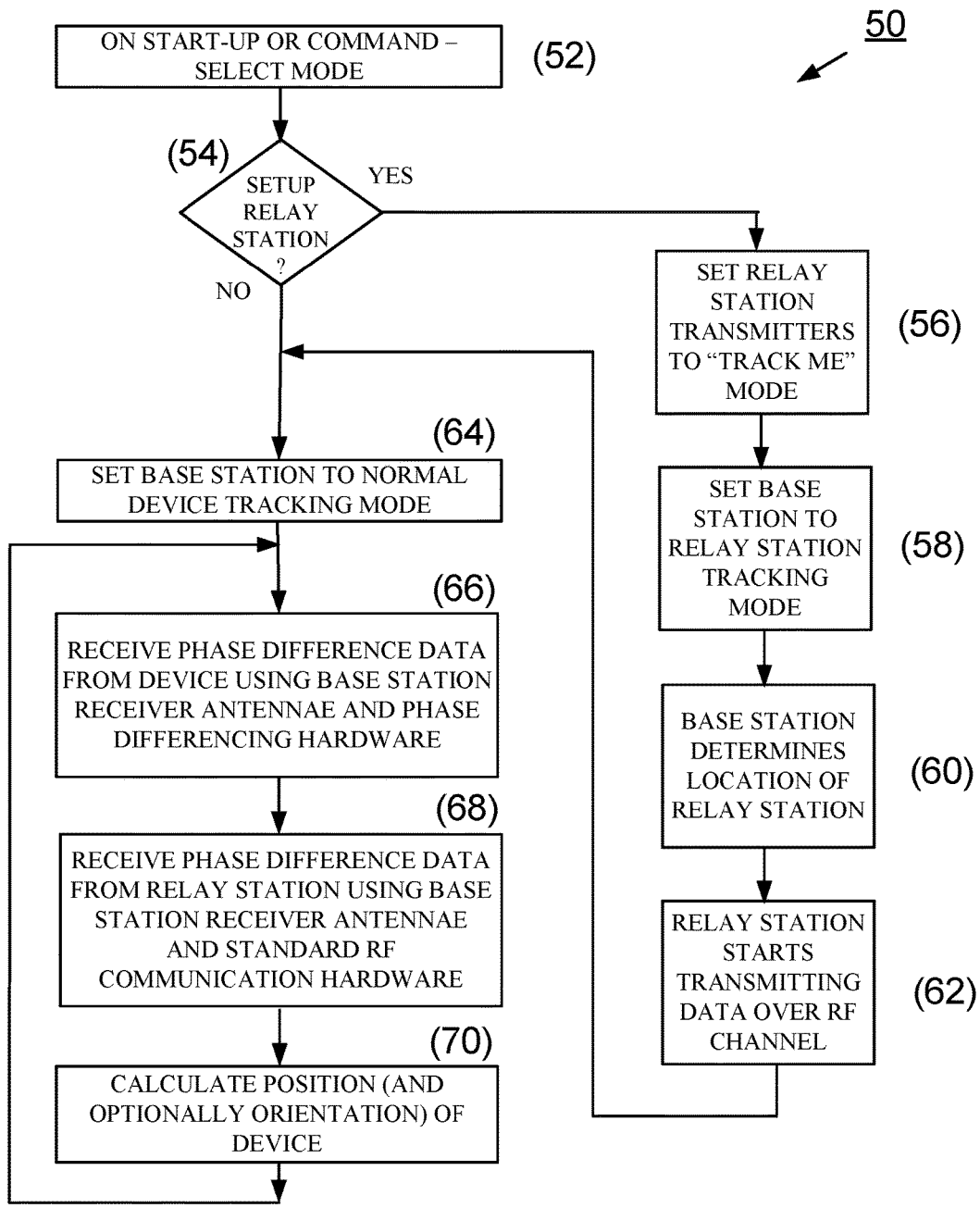
FIG. 5 is a flow diagram detailing embodiments of modes of the relay station.

FIG. 5 is an embodiment of a process 50 illustrating operating modes of the position tracking system 10. When position tracking system 10 is started, or when commanded, it enters the selection mode 52. In the selection mode, a mode is selected either to enter normal device tracking or to set up the relay station 16. If, at step 54, normal tracking is selected, the program enters normal tracking mode 64. If instead, at step 54, the selected mode is to set up the relay station 16, the process 50 proceeds to block 56. At block 56, the transmitting antennae 24-1, 24-2 turn on such that transmitting antennae 24-1, 24-2 are transmitting on different frequencies from each, as if transmitting antennae 24-1, 24-2 were separate devices being tracked (like a device with transmitter 18).

In addition, the base station 12 is set (step 58) to track the transmitting antennae 24-1, 24-2, and, thus, to determine (step 60) their positions using equations Eq. 8-Eq. 21. The positions of the transmitting antennae 24-1, 24-2 are saved at the base station 12 so that equations Eq. 22-Eq. 24 can be utilized to improve tracking performance. At step 62, the relay station 16 switches over from generating device signatures to transmitting phase difference data produced by calculating equations Eq. 22-Eq. 24.

After step 62 completes, or if normal tracking mode has already been entered, the position-tracking system 10 starts tracking the device (i.e., the device transmitting antenna 18). This tracking is accomplished by using the base station 12 to obtain (step 66) phase difference data from signals received by the base receiver antennae 10, processed by phase differencing hardware, and computing phase differences as described by equations Eq. 5-Eq. 7. The base station 12 also has channels (which may be multiplexed from the base receiver antennae 14, or in parallel) for receiving (step 68) the digital RF encoded data that is coming from the relay station 16, which represents the phase difference ($\delta_{13,14}$=r13-r14) measured at the relay station 16. Equations for device position computation (for example, Eq. 1-7 and Eq. 22-24) are performed in step 70 and another computation cycle repeats, starting at step 66.

In one embodiment, a wireless relay station 16 is disclosed. The wireless relay station can be powered by battery or electrical outlet, but the encoded data connection to the base station 12 is completely wireless. In the general embodiment, a single multiplexed antenna or separate transmit and receive antennae are incorporated at the relay station. The range of each transmit antenna 24 in the relay station 16 is first determined as if it were a normal tracked device. This determines the range between the relay station 16 and the base station 12. For non-concentric transmit/receive antennae, a simple hook and appropriate weight can place the relay station 16, and, therefore, the physical antennae placement, into a known relationship. More elaborate schemes are detailed in the discussion of FIG. 3. This is all performed in a setup mode, as described previously in the process 50 described in FIG. 5.

After the locations of the relay stations transmitters 24 are determined, the range from the transmit antenna 24 of the relay station 16 to the base station antennae 14 can be converted to phase measurements $\delta_i$ and used to offset the total range from the device to the relay station and then to the base station antennae. This provides another set of equations, as illustrated in equations Eq. 25-Eq. 33.

$$r1 = \sqrt{(rcvrpos_{1,1} - x_1)^2 + (rcvrpos_{1,2} - x_2)^2 + (rcvrpos_{1,3} - x_3)^2} \quad \text{(Eq. 25)}$$

$$r2 = \sqrt{(rcvrpos_{2,1} - x_1)^2 + (rcvrpos_{2,2} - x_2)^2 + (rcvrpos_{2,3} - x_3)^2} \quad \text{(Eq. 26)}$$

$$r3 = \sqrt{(rcvrpos_{3,1} - x_1)^2 + (rcvrpos_{3,2} - x_2)^2 + (rcvrpos_{3,3} - x_3)^2} \quad \text{(Eq. 27)}$$

$$r4 = \sqrt{(rcvrpos_{4,1} - x_1)^2 + (rcvrpos_{4,2} - x_2)^2 + (rcvrpos_{4,3} - x_3)^2} \quad \text{(Eq. 28)}$$

$$r_{relaystation} = \sqrt{(rcvrpos_{relaystation,1} - x_1)^2 + (rcvrpos_{relaystation,2} - x_2)^2 + (rcvrpos_{relaystation,3} - x_3)^2} \quad \text{(Eq. 29)}$$

$$\delta_{1,relaystation} = r1 - r_{relaystation} - \Theta_1 \quad \text{(Eq. 30)}$$

$$\delta_{2,relaystation} = r2 - r_{relaystation} - \Theta_2 \quad \text{(Eq. 31)}$$

$$\delta_{3,relaystation} = r3 - r_{relaystation} - \Theta_3 \quad \text{(Eq. 32)}$$

$$\delta_{4,relaystation} = r4 - r_{relaystation} - \Theta_4 \quad \text{(Eq. 33)}$$

Here, r1-r4 are again the equations for the base station antennae ranges to the device transmitter 18; $r_{relaystation}$ is the range between the relay station 16 to the device transmitter 18. Additional equations Eq. 30-Eq. 33 are now available for incorporating into the tracking solution. In Eq. 30-Eq. 33, $\Theta_i$ corresponds to wave cycles to prevent cycle ambiguity, an example use of which is described in U.S. patent application Ser. No. 13/975,724, filed Aug. 26, 2013, and titled "Radio Frequency Communication System," the entirety of which application is incorporated by reference herein. One way to provide phase measurement or related timing data (calculated from Eq. 30-33) to the base station 12 is for the relay station 16 to transmit it on a separate frequency. Additional circuitry at the base station 12 can provide filtering means to separate this data from direct transmission from the device transmitter 18. Other techniques such as spread spectrum encoding and decoding can be used to allow multiple devices to share limited bandwidth without interference. Ultra wideband or similar wide spectrum transmission techniques, comparing time stamped pulsed signals sent from the device transmitter to the relay and/or base station, can also determine range and therefore provide $\Theta$ or cycle wave count between device transmitter to the relay station and/or base station receiver antennae.

One of ordinary skill in the art will recognize that labelling the base station and the relay station is a designer choice. Further, processing of signal data (i.e., the equations above) and consolidation of the results from different receivers to track an object may be split among processors at the base and relay stations.

As will be appreciated by one skilled in the art, aspects of the present invention may be embodied as a system, method, and computer program product. Thus, aspects of the present invention may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

The computer readable medium may be a computer readable storage medium, examples of which include, but are not limited to, an electronic, magnetic, optical, electromagnetic, infrared, or semiconductor system, apparatus, or device, or any suitable combination thereof. As used herein, a computer readable storage medium may be any tangible medium that can contain or store a program for use by or in connection with an instruction execution system, apparatus, device, computer, computing system, computer system, or any programmable machine or device that inputs, processes, and outputs instructions, commands, or data. A non-exhaustive list of specific examples of a computer readable storage medium include an electrical connection having one or more wires, a portable computer diskette, a floppy disk, a hard disk, a random access memory (RAM), a read-only memory (ROM), a USB flash drive, an non-volatile RAM (NVRAM or NOVRAM), an erasable programmable read-only memory (EPROM or Flash memory), a flash memory card, an electrically erasable programmable read-only memory (EEPROM), an optical fiber, a portable compact disc read-only memory (CD-ROM), a DVD-ROM, an optical storage device, a magnetic storage device, or any suitable combination thereof.

Program code may be embodied as computer-readable instructions stored on or in a computer readable storage medium as, for example, source code, object code, interpretive code, executable code, or combinations thereof. Any standard or proprietary, programming or interpretive language can be used to produce the computer-executable instructions. Examples of such languages include C, C++, Pascal, JAVA, BASIC, Smalltalk, Visual Basic, and Visual C++.

Transmission of program code embodied on a computer readable medium can occur using any appropriate medium including, but not limited to, wireless, wired, optical fiber cable, radio frequency (RF), or any suitable combination thereof.

The program code may execute entirely on a user's computer, partly on the user's computer, as a stand-alone software package, partly on the user's computer and partly on a remote computer or entirely on a remote computer or server. Any such remote computer may be connected to the user's computer through any type of network, including a local area network (LAN) or a wide area network (WAN), or the connection may be made to an external computer (for example, through the Internet using an Internet Service Provider).

In addition, the described methods can be implemented using ultrawideband for direct range measurement between the device and the base and relay stations, on an image processing device and/or infrared ranging at either the mobile device or at the base and/or relay stations, or the like, or on a separate programmed general purpose computer. Additionally, the methods of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, or the like. In general, any device capable of implementing a state machine that is in turn capable of implementing the proposed methods herein can be used to implement the image processing system according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The methods illustrated herein however can be readily implemented in hardware and/or software using any known or later developed systems or structures, devices and/or software by those of ordinary skill in the applicable art from the functional description provided herein and with a general basic knowledge of the computer and image processing arts.

Moreover, the disclosed methods may be readily implemented in software executed on programmed general purpose computer, a special purpose computer, a microprocessor, or the like. In these instances, the systems and methods of this invention can be implemented as program embedded on personal computer such as JAVA® or CGI script, as a resource residing on a server or graphics workstation, as a routine embedded in a dedicated fingerprint processing system, as a plug-in, or the like. The system can also be implemented by physically incorporating the system and method into a software and/or hardware system.

Relative terms used herein, such as top, bottom, front, back, side, left, right, above, below, upper, and lower, refer to how features of the apparatus appear in the figures, and serve to facilitate the description of the invention, and are not meant to be interpreted as limitations.

While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents, and variations that are within the spirit and scope of this invention.

What is claimed is:

1. A method of tracking a position of a mobile device with an electromagnetic signal transmitting antenna, the method comprising:
    receiving, by one or more relay receiver antennae of a relay station and by a plurality of spatially separated base receiver antennae in communication with a base station, electromagnetic signals transmitted by the electromagnetic signal transmitting antenna of the mobile device;
    transmitting, by the relay station to the base station, first timing information associated with the electromagnetic signals received by the one or more relay receiver antennae of the relay station; and
    determining, by the base station, a physical position of the electromagnetic signal transmitting antenna of the mobile device based on second timing information acquired from the electromagnetic signals received by the plurality of spatially separated base receiver antennae in communication with the base station and on the first timing information transmitted from the relay station to the base station.

2. The method of claim 1, further comprising measuring, by the relay station, a phase difference from the electromagnetic signals transmitted by the electromagnetic signal transmitting antenna of the mobile device and received by two relay receiver antennae of the relay station, and wherein the first timing information transmitted by the relay station to the base station includes the measured phase difference.

3. The method of claim 1, further comprising measuring, by the relay station, time difference of arrival information from the electromagnetic signals transmitted by the electromagnetic signal transmitting antenna of the mobile device and received by two relay receiver antennae of the relay station, and wherein the first timing information transmitted by the relay station to the base station includes the measured time difference of arrival information.

4. The method of claim 1, wherein transmitting, by the relay station to the base station, the first timing information associated with the electromagnetic signals received by the one or more relay receiver antennae of the relay station includes retransmitting the received electromagnetic signals to the base station from multiple transmitting antennae of the relay station.

5. The method of claim 1, further comprising determining, by the base station, orientation of the mobile device based on the electromagnetic signals received by the plurality of spatially separated base receiver antennae in communication with the base station.

6. The method of claim 1, further comprising determining, by the base station, a physical location of each transmitting antenna of the relay station relative to the plurality of spatially separated base receiver antennae in communication with the base station.

7. The method of claim 6, wherein determining, by the base station, the physical location of each transmitting antenna of the relay station relative to the plurality of spatially separated base receiver antennae in communication with the base station includes receiving, by the base station, electromagnetic signals transmitted by each transmitting antenna of the relay station.

8. The method of claim 7, wherein each transmitting antenna of the relay station transmits the electromagnetic signals at a different frequency from each other transmitting antenna of the relay station.

9. The method of claim 6, further comprising determining a position of each of the one or more relay receiver antennae of the relay station with respect to each transmitting antenna of the relay station.

10. The method of claim 9, wherein determining the position of each of the one or more relay receiver antennae of the relay station with respect to each transmitting antenna of the relay station occurs at the relay station, and further comprising transmitting, by the relay station to the base station, the position of each of the one or more relay receiver antennae of the relay station.

11. The method of claim 10, wherein determining the position of each of the one or more relay receiver antennae of the relay station with respect to each transmitting antennae of the relay station includes determining each position using a global positioning system (GPS).

12. The method of claim 9, wherein determining the position of each of the one or more relay receiver antennae of the relay station with respect to each transmitting antenna of the relay station occurs at the base station.

13. The method of claim 1, wherein the transmission by the relay station to the base station of the first timing information associated with the electromagnetic signals received by the one or more relay receiver antennae of the relay station occurs over a wireless communication channel.

14. The method of claim 1, wherein the transmission by the relay station to the base station of the first timing information associated with the electromagnetic signals received by the one or more relay receiver antennae of the relay station occurs over a different frequency channel from a frequency channel over which the electromagnetic signals are transmitted by the electromagnetic signal transmitting antenna of the mobile device.

15. The method of claim 1, further comprising offsetting, by the base station, the first timing information received from the relay station by third timing information associated with a distance of the relay station from the base station.

16. The method of claim 1, wherein the transmission by the relay station to the base station of the first timing information associated with the electromagnetic signals received by the one or more relay receiver antennae of the relay station occurs over a wired communication link.

17. The method of claim 1, wherein the relay station is a first relay station and the mobile device operates as a second relay station, and further comprising:
  receiving, by one or more receiver antennae of the second relay station electromagnetic signals transmitted by an electromagnetic signal transmitting antenna of the first relay station; and
  transmitting, by the second relay station to the base station, third timing information associated with the electromagnetic signals received by the one or more receiver antennae of the second relay station.

18. A relay station, comprising:
  two or more receiver antennae that receive first electromagnetic signals transmitted by a transmitting antenna of a mobile device; and
  two or more transmitter antennae transmitting timing information related to the first electromagnetic signals received by the two or more receiver antennae;
  a processor configured to operate in a first mode in which the processor directs the two or more transmitter antennae to each transmit a device signature at a different frequency from the other transmitter antennae, and to operate in a second mode in which the processor obtains the timing information from the first electromagnetic signals received by the two or more receiver antennae and directs the two or more transmitter antennae to transmit second electromagnetic signals carrying the timing information.

19. The relay station of claim 18, wherein the processor measures phase difference data based on the first electromagnetic signals received by the two or more receiver antenna, and wherein the timing information transmitted by the two or more transmitter antennae includes the phase difference data.

20. The relay station of claim 18, wherein the timing information transmitted by the two or more transmitter antennae includes time of arrival information associated with the first electromagnetic signals received by the two or more receiver antennae.

21. The relay station of claim 18, wherein each of the two or more transmitter antennae uses a different frequency from a frequency at which the first electromagnetic signals are received by the two or more receiver antennae.

* * * * *